US010057235B2

(12) United States Patent
Ignatchenko et al.

(10) Patent No.: US 10,057,235 B2
(45) Date of Patent: *Aug. 21, 2018

(54) METHODS APPARATUSES AND SYSTEMS FOR PROVIDING USER AUTHENTICATION

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,404

(22) Filed: Jun. 26, 2017

(65) Prior Publication Data

US 2017/0346803 A1 Nov. 30, 2017

Related U.S. Application Data

(63) Continuation of application No. 14/209,119, filed on Mar. 13, 2014, now Pat. No. 9,699,159.

(Continued)

(51) Int. Cl.
*H04L 29/06* (2006.01)
*G06Q 20/40* (2012.01)
(Continued)

(52) U.S. Cl.
CPC ............ *H04L 63/08* (2013.01); *G06Q 20/20* (2013.01); *G06Q 20/204* (2013.01);
(Continued)

(58) Field of Classification Search
CPC .. H04L 63/08; G06Q 20/206; G06Q 20/4012; G06Q 20/388; G06Q 20/3278;
(Continued)

(56) References Cited

U.S. PATENT DOCUMENTS 5,796,827 A 8/1998 Coppersmith et al.
6,477,117 B1 11/2002 Narayanaswami et al.
(Continued)

FOREIGN PATENT DOCUMENTS

EP 1 283 474 A1 2/2004
GB 2 397 424 A 7/2004
(Continued)

OTHER PUBLICATIONS

Acharya et al., "Unleashing the Power of Wearable Devices in a SIP Infrastructure," Proceedings of the Third IEEE in 1 Conference on Pervasive Computing and Communications (2005).
(Continued)

*Primary Examiner* — Mahfuzur Rahman
(74) *Attorney, Agent, or Firm* — Arnold & Porter Kaye Scholer

(57) ABSTRACT

The methods, apparatuses and systems described herein provide a system for authenticating users, authorization or information during secure transactions. The system may include a transaction device requiring user authentication, a personal communication device, and a wearable authentication device that communicates with both of the other devices. In one aspect, the wearable authentication device may be configured to communicate with the transaction device requiring authentication and the personal communication device through one or more wireless communication technologies, wherein the wearable authentication device may be configured to act as an intermediary between the transaction device and the personal communication device to facilitate the exchange of at least one authentication information or transaction completion information between the personal communication device and the transaction device.

20 Claims, 9 Drawing Sheets

Related U.S. Application Data

(60) Provisional application No. 61/785,279, filed on Mar. 14, 2013.

(51) Int. Cl.
*G06Q 20/38* (2012.01)
*G06Q 20/32* (2012.01)
*G06Q 20/20* (2012.01)
*G06Q 20/34* (2012.01)

(52) U.S. Cl.
CPC ....... *G06Q 20/206* (2013.01); *G06Q 20/3278* (2013.01); *G06Q 20/352* (2013.01); *G06Q 20/388* (2013.01); *G06Q 20/3823* (2013.01); *G06Q 20/4012* (2013.01); *G06Q 20/40145* (2013.01)

(58) Field of Classification Search
CPC ......... G06Q 20/3823; G06Q 20/40145; G06Q 20/204; G06Q 20/20; G06Q 20/352
See application file for complete search history.

(56) References Cited

U.S. PATENT DOCUMENTS

| | | |
|---|---|---|
| 6,525,997 B1 | 2/2003 | Narayanaswami et al. |
| 6,556,222 B1 | 4/2003 | Narayanaswami |
| 6,720,860 B1 | 4/2004 | Narayanaswami |
| 6,977,868 B2 | 12/2005 | Brewer et al. |
| 7,081,905 B1 | 7/2006 | Raghunath |
| 7,203,524 B2 | 4/2007 | Tushinsky et al. |
| 7,203,665 B2 | 4/2007 | Donner |
| 7,280,097 B2 | 10/2007 | Chen |
| 7,356,706 B2 | 4/2008 | Scheurich |
| 7,463,205 B2 | 12/2008 | Turner et al. |
| 7,477,890 B1 | 1/2009 | Narayanaswami et al. |
| 7,597,250 B2 | 10/2009 | Finn |
| 7,886,968 B2 | 2/2011 | Shoemaker |
| 8,495,372 B2 | 7/2013 | Bailey et al. |
| 8,566,588 B2 | 10/2013 | Lugt et al. |
| 8,595,810 B1 | 11/2013 | Ayed |
| 8,640,944 B1 | 2/2014 | Gazdzinski |
| 8,751,313 B2 | 6/2014 | Fisher |
| 8,915,447 B2 | 12/2014 | Jain et al. |
| 2002/0021622 A1 | 2/2002 | Chen |
| 2002/0160768 A1 | 10/2002 | Gventer |
| 2003/0151982 A1 | 8/2003 | Brewer et al. |
| 2003/0159040 A1 | 8/2003 | Hashimoto et al. |
| 2005/0109841 A1 | 5/2005 | Ryan et al. |
| 2006/0208066 A1 | 9/2006 | Finn et al. |
| 2006/0288233 A1 | 12/2006 | Kozlay |
| 2007/0043594 A1 | 2/2007 | Lavergne |
| 2007/0080931 A1 | 4/2007 | Chen et al. |
| 2007/0080933 A1 | 4/2007 | Chen et al. |
| 2007/0087790 A1 | 4/2007 | Worick et al. |
| 2007/0109208 A1 | 5/2007 | Turner |
| 2007/0146218 A1 | 6/2007 | Turner |
| 2007/0182524 A1 | 8/2007 | Fushinsky |
| 2007/0294746 A1 | 12/2007 | Sasakura et al. |
| 2008/0040951 A1 | 2/2008 | Kates |
| 2008/0201576 A1 | 8/2008 | Kitagawa et al. |
| 2008/0293453 A1 | 11/2008 | Atlas et al. |
| 2009/0219788 A1 | 9/2009 | Henley, Jr. |
| 2009/0280861 A1 | 11/2009 | Kahn |
| 2011/0136430 A1 | 6/2011 | Konya |
| 2011/0215921 A1 | 9/2011 | Ayed et al. |
| 2011/0291834 A1 | 12/2011 | Goldyrev et al. |
| 2012/0081282 A1 | 4/2012 | Chin |
| 2012/0143707 A1 | 6/2012 | Jain |
| 2012/0185306 A1 | 7/2012 | Cheng |
| 2013/0146659 A1 | 6/2013 | Zhou et al. |
| 2014/0009262 A1 | 1/2014 | Robertson et al. |
| 2014/0040139 A1 | 2/2014 | Brudnicki et al. |
| 2014/0172680 A1 | 6/2014 | Prabhu |
| 2015/0371215 A1 | 12/2015 | Zhou et al. |

FOREIGN PATENT DOCUMENTS

| | | |
|---|---|---|
| WO | WO 2009/039419 | 3/2009 |
| WO | WO 2010/004353 A2 | 1/2010 |

OTHER PUBLICATIONS

Anonymous, Burg5Phone Watch—buy at Firebox.com, retrieved from the Internet at http://www.firebox.com/product/3884/Burg5-Phone-Watch, Jul. 8, 2011.

Anonymous, Hands on with the Sony Ericsson LiveView Coolest Gadgets, retrieved from the Internet at http:www.coolest-gadgets.com/20110309/hands-sony-ericsson-liveview/#more-54240 Jul. 8, 2011.

Bisdikiya, IBM Research Report,"An Overview of the Bluetooth Wireless Technology," *IEEE*, IBM Corporation, Jun. 6, 2001.

Brownlee, Citizen's i:Virt M Wristwatches Control Your Cellphone Remotely—New Tech Gadgets & Electronic Devices, Geek.com, retrieved from the Internet at http:www.geek.com/articles/gadgets/citizens-ivirt-m-wristwatches-control-your cellphone-remotely-1217892/ Apr. 30, 2010.

Dideles, Bluetooth: A Technical Overview, vol. 9, Issue 4, Crossroads; ACM Jun. 4, 2003.

International Search Report and Written Opinion for International Patent Application PCT/IB2014/059763, dated Jul. 7, 2014.

Narayanaswami, "Form Factors for Mobile Computing and Device Symbiosis," *Proceedings of the 2005 Eighth International Conference on Document Analysis and Recognition* (2005).

Quick, Armatrix SmartGun Safety System Uses Wristwatch to Authenticate Weapons, retrieved from the Internet at http://www.gizmag.com/armatrix-wristwatch-safetysystem-for-handguns/14044/ Feb. 1, 2010.

Williams, Casio Develops Bluetooth Watch to Control Mobile Phone, Techworld, retrieved from the Internet at http://news.techworld.com/personal-tech/3261055/casio-develops-bluetooth-watch-to-control-mobile-phone/?print, Feb. 15, 2011.

METHODS APPARATUSES AND SYSTEMS FOR PROVIDING USER AUTHENTICATION

RELATED APPLICATIONS

This application is a continuation of U.S. application Ser. No. 14/209,119, filed Mar. 13, 2014, which claims priority to U.S. Provisional Application No. 61/785,279, filed Mar. 14, 2013, both entitled "Methods, Apparatuses and Systems for Providing User Authentication," the contents of both of which are incorporated herein by reference in their entireties.

FIELD OF THE DISCLOSURE

This invention is applicable at least in the fields of user authentication and secured transactions.

BACKGROUND

Modern life involves a large number of transactions that require user authentication. For example, bank customers provide credit/debit cards and enter PINs to obtain cash at ATMs. Retail customers use credit cards—which provide account information and a weak form of user authentication—to buy items at stores. Employees at secure facilities enter pass codes or place their fingers on fingerprint scanners to enter secured entrances. An average person in a modern economy requires a large number of devices or procedures that provide at least some form of user authentication: credit cards, bank cards, key fobs, biometric scanning, pass codes, etc. A person must not only carry a large number of cards and other devices, he or she must search for and remove the correct authentication device before each transaction. In the case of biometric scanners, a user must remember how to use each device and in many cases must wait a significant amount of time while the scanner compares the user's biometric data against a large database of other users' biometric information. In addition to these problems, having a large number of authentication devices and procedures means that individual devices may be easily lost and individual security codes may be easily forgotten. In the case of a lost wallet or purse, replacing the individual authentication devices may require a great deal of effort.

There is therefore a need for improved user authentication technology.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In accordance with an exemplary embodiment of the present disclosure, a system for authenticating users, authorization or information during secure transactions is provided. The system generally includes a transaction device requiring user authentication, a personal communication device, and a wearable authentication device that communicates with both of the other devices. In certain embodiments, the wearable authentication device may be configured to communicate with the transaction device requiring authentication and the personal communication device through a wireless communication technology, wherein the wearable authentication device is configured to act as an intermediary between the transaction device and the personal communication device to facilitate the exchange of at least one authentication information or transaction completion information between the personal communication device and the transaction device.

A method of user authorization or information authentication according to the present disclosure may comprise initiating a transaction with a transaction device requiring an authentication information, providing the authentication information through a user input interface of a wearable authentication device, and transmitting the authentication information from the wearable authentication device to the transaction device. The method may further comprise transmitting the transaction completion information from the personal communication device to the wearable authentication device and transmitting transaction completion information from the wearable authentication device to the transaction device. In some embodiments of the method, the method may comprise entering authentication information using a user input interface of a wearable authentication device.

For accomplishing the foregoing and related ends, certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

BRIEF DESCRIPTION OF THE DRAWINGS

In the accompanying drawings that form a part of the specification and are to be read in conjunction therewith, the present invention is illustrated by way of example and not limitation, with like reference numerals referring to like elements. It should be noted that the connections illustrated in all the Figures of the present disclosure are intended to illustrate interactions. The illustrated connections should be regarded as logical connections, and should not be regarded as limited to physical connections.

DETAILED DESCRIPTION

In the following detailed description, numerous specific details are set forth in order to provide a thorough understanding of the invention. In other instances, well known structures, interfaces, and processes have not been shown in detail to avoid unnecessarily obscuring the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
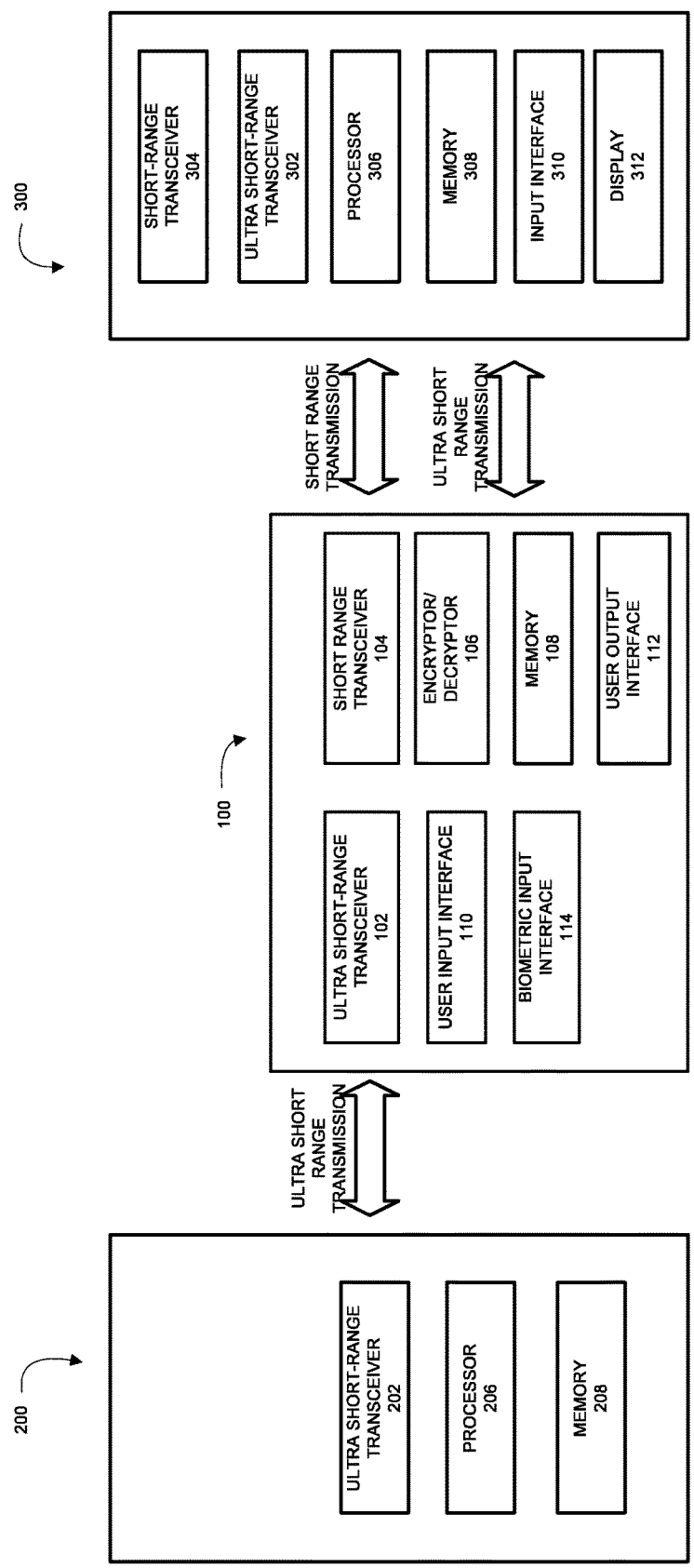
FIG. 1 is a bock diagram of a wearable authentication device, transaction device, and a personal communication device that may be used in the systems and methods of the present disclosure.

FIG. 1 is a block diagram illustrating some of the components that comprise an exemplary wearable authentication device 100, transaction device 200, and personal communication device 300 which may be used to implement the systems, apparatuses and methods disclosed herein. It should be understood that the block diagrams do not depict every component that comprises these devices and those with skill in the art recognize that these devices may include additional components (such as battery, communication busses, clocks, etc.) in a working embodiment of the device.

The wearable authentication device 100 is capable of communicating with both the transaction device 200 and the personal communication device 300. The wearable authentication device 100 may be worn comfortably on a user's body. In some embodiments, the wearable authentication device 100 may have a watch-like form factor. For example, it may be worn on a user's wrist or it may be carried in the manner of a pocket watch. In other embodiments, the wearable authentication device 100 may be implemented as a ring that may be worn by a user.

As shown in FIG. 1, the wearable authentication device 100 may include, among other components (not shown), an ultra short-range transceiver 102, a short range transceiver 104, an encryptor/decryptor 106, a memory 108, at least one user input interface 110, a user output interface 112, and a biometric input interface 114. The user input interface 110 may comprise one or more buttons, a keyboard (which may be a physical keyboard or a virtual keyboard implemented through a touch sensitive display), one or more sensors or any other appropriate combination of hardware or software for inputting information into the wearable authentication device. The biometric input interface 114 may be any device for receiving biometric information including, but not limited to, a fingerprint or retina patterns. The user output interface 112 may be implemented using any appropriate display technology, including touch sensitive displays that are capable of receiving user input. It is to be understood that these components are described in functional terms and that one or more components may be combined together into one piece of hardware and/or software or spread across multiple pieces of hardware and/or software. As will be clear from the following discussion, these components are merely illustrative and need not necessarily be included in every embodiment of the wearable authentication device 100.

The transaction device 200 may be a point-of-sale (POS) device, an ATM device, an electronic door lock, a check-in kiosk at an airport or train station, or any other device that requires user authentication. As shown in FIG. 1, the transaction device 200 may include, among other components (not shown), an ultra short-range transceiver 202, a processor 206 and a memory 208. It is to be understood that these components are illustrative and need not necessarily be included in every embodiment of the transaction device 200.

The personal communication device 300 may be a mobile phone or smartphone, a personal digital assistant (PDA), a laptop computer, a tablet, or any other device capable of storing user authentication information and/or transaction completion information. As shown in FIG. 1, the personal communication device 300 may include, among other components (not shown), an ultra short-range transceiver 302, a short-range transceiver 304, a processor 306, a memory 308, a user input interface 310 and a display 312. It is to be understood that these components are illustrative and need not necessarily be included in every embodiment of the personal communication device 300.

The personal communication device 300 may store (for example, in the memory 308) authentication information, transaction completion information or both. Authentication information may include PINs, passwords, private encryption keys, biometric data (e.g., fingerprints, retina patterns, etc.) or any other type of information that may be used to authenticate a user. Transaction completion information may include credit card information (e.g., credit card number, security code, expiration date, etc.), debit card information, flight confirmation codes, train reservation numbers, door lock key codes, or any other type of information that may be required to complete a secure transaction.

In one embodiment, the wearable authentication device 100 may communicate with transaction device 200 using the ultra short-range transceivers 102, 202. The ultra short-range transceivers may implement any appropriate form of ultra short-range transmission technology and/or protocol such as, for example, Near Field Communication (NFC) or similar technologies. Because ultra short-range transmission technologies require the transmitting and receiving devices to be very close to each other (e.g., in the order of several millimeters or centimeters), they permit for an added measure of security because the authentication device 100 has to be physically close to the transaction device 200.

The position of the transceivers (or separate transmitters and receivers) on the authentication device 100 and the transaction device 200 is a matter of design choice subject to the fact that the user while wearing (e.g., on the wrist or on a finger) or holding the wearable authentication device 100 should be able to comfortably place the authentication device close to the transaction device 200 such that the two devices can transmit or receive information from each other. In some embodiments, the transceivers should be located such that the user can additionally manipulate or interact with the wearable authentication device 100 as indicated herein (e.g., input information using the user input interface 110 or to review information displayed on the user output interface 112) while the authentication device 100 and transaction device 200 are communicating with each other.

In some embodiments, the wearable authentication device 100 may communicate with the personal communication device 300 using short-range transceivers 104, 304. The short-range transceivers may implement any appropriate form of short-range transmission technology or protocol, such as induction-based communication technologies, Bluetooth, WiFi, or other wireless technologies that allow communication over relatively short distances (e.g. in the order of within one or two meters). In one embodiment, a low-energy implementation of Bluetooth technology may be used to decrease power consumption and increase battery life.

In an exemplary embodiment, the authentication process begins when the transaction device 200 and the wearable authentication device 100 are positioned very close to each other such that they can communicate using the ultra short-range transceivers 102, 202. The transaction device 200 and the personal communication device 300 may communicate with each other via the wearable authentication device 100, i.e., the wearable authentication device 100 may act as an intermediary between the other devices. Authentication may be based on an exchange of information between the transaction device 200 and the personal communication device 300 and the fact that a user possesses both the wearable authentication device 100 and a corresponding personal communication device 300.

In some embodiments, authentication may be made even more robust by requiring a user to enter authentication information via a user input interface 110 and/or biometric input interface 114 on the wearable authentication device 100. Data transfer between the transaction device 200 and the personal communication device 300 via the wearable authentication device 100 may be made subject to explicit user authorization. For example, if a transaction device 200 requests transaction completion information (stored on the personal communication device 300) that the user has marked "hidden," the user may be required to enter authentication information via a user input interface and/or biometric input interface on the wearable authentication device 100. For example, the user may be required to enter a personal identification number (PIN), or to provide some form of biometric authentication (e.g., a fingerprint through a fingerprint reader on the wearable authentication device). The wearable authentication device 100 may transmit the authentication information to the personal communication device 300, and the personal communication device may process the authentication information to determine whether the requested transaction completion information should be released to the transaction device 200.

In some embodiments, to ensure that communications between the wearable authentication device 100 and personal communication device 300 are secure, and to serve as an additional layer of authentication to ensure that the correct devices are communication with each other, a form of encryption may be used. One appropriate form of encryption may include a symmetric key encryption methodology such as Advanced Encryption Standard (AES), Twofish, Serpent, Blowfish, CAST-128 (also referred to as CAST5), RC4 (also referred to as ARC4 or ARCFOUR), Triple Data Encryption Algorithm (TDEA or Triple DEA), or International Data Encryption Algorithm (IDEA). Of course, it should be recognized that any form of encryption (whether symmetric key or asymmetric key encryption) may be used with the present disclosure.

Figure 2:
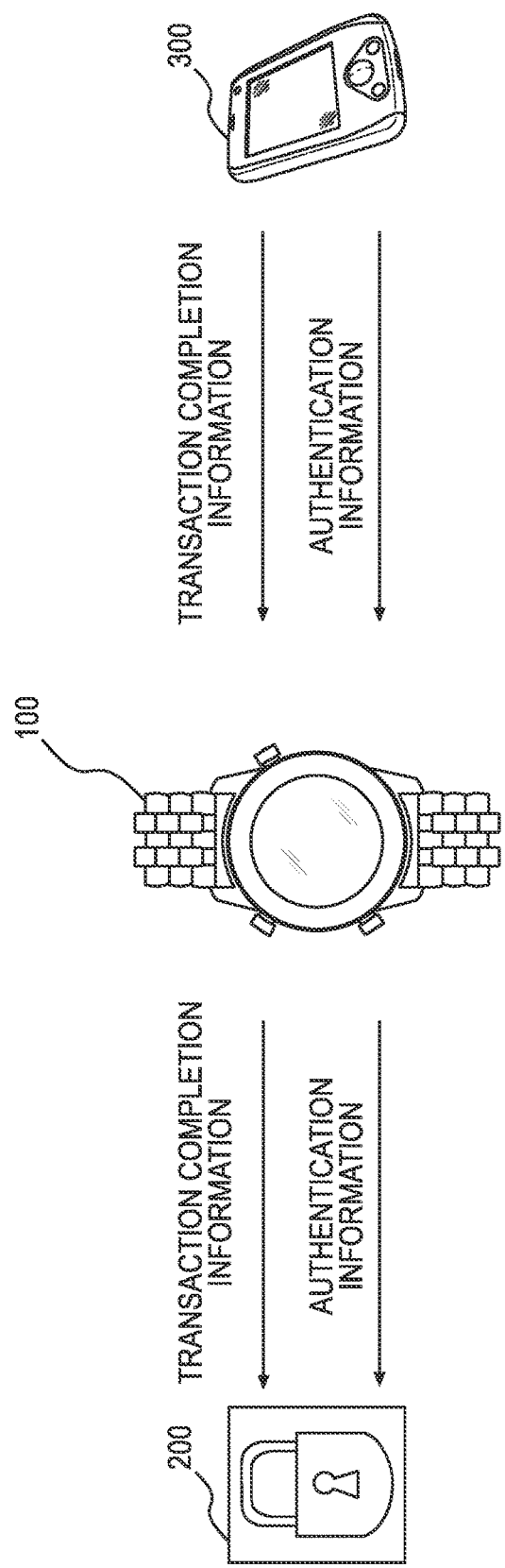
FIG. 2 is a diagram illustrating a user authentication system in which user authentication information and transaction completion information are sent from a personal communication device via a wearable authentication device to a transaction device.

With reference to FIG. 2, in one implementation of a secure transaction, user authentication information and transaction completion information may be sent from the personal communication device 300 via the wearable authentication device 100 to the transaction device 200. Because both the personal communication device 300 and wearable authentication device 100 should be present for authentication to proceed, security is thereby enhanced. Additionally, the wearable authentication device 100 reduces the chance that a user will lose a personal communication device 300 or authentication items (e.g., credit cards) because it enables the user to provide authentication information and transaction completion information without removing a personal communication device 300 or authentication items from a wallet, purse, or pocket.

When the wearable authentication device 100 is positioned near the transaction device 200, the wearable authentication device 100 may request authentication information and/or transaction completion information from the personal communication device 300. The personal communication device 300 may then transmit the requested authentication information and/or transaction completion information to the wearable authentication device 100, which in turn may transmit the authentication information and transaction completion information to the transaction device 200. During this exchange of information, the authentication information and/or the transaction completion information (or any other information that relates to the secure transaction or may be useful to the user) may be displayed on the user output interface 112.

Figure 3A:
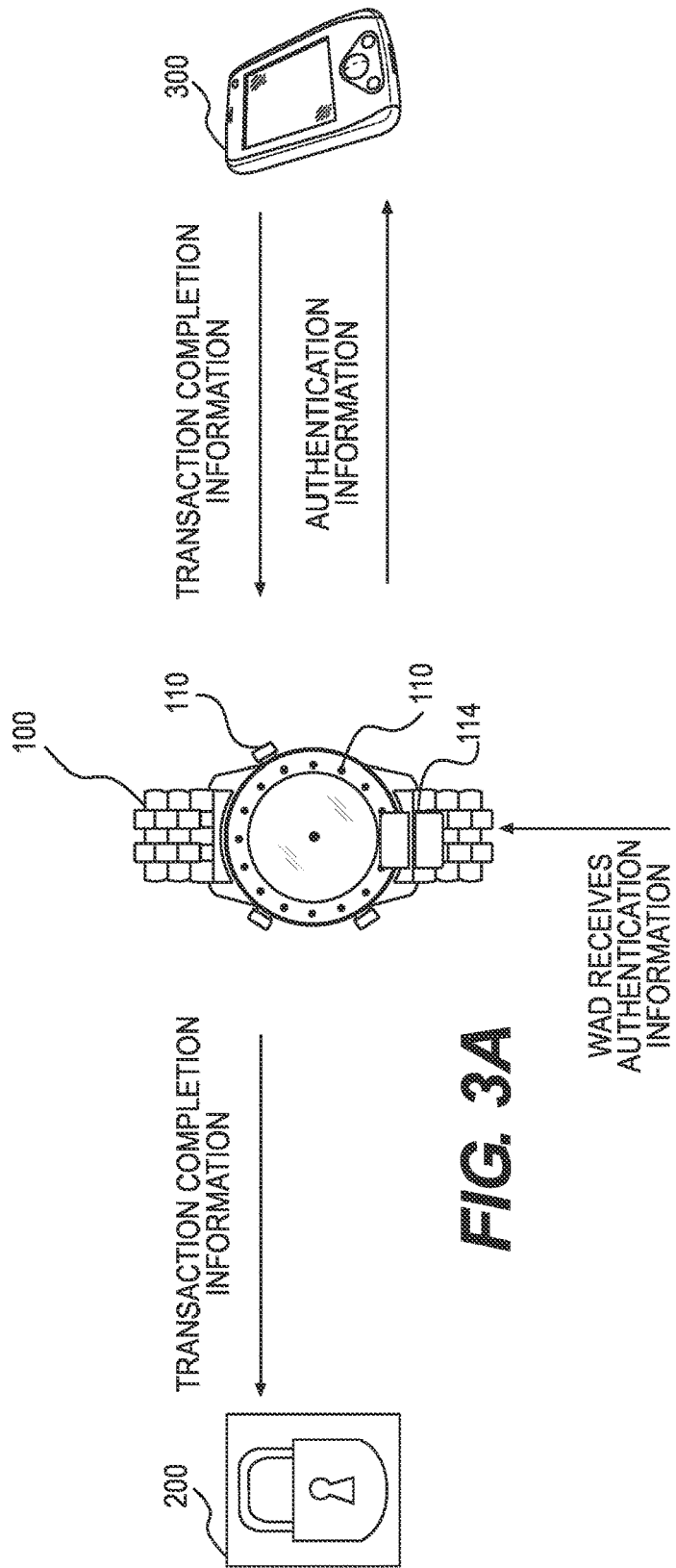
FIG. 3A is a diagram illustrating a user authentication system in which user authentication information—provided by a user via user input—is sent to a personal communication device and transaction completion information is sent from the personal communication device via a wearable authentication device to a transaction device.

In another implementation of a secure transaction according to the present disclosure, with reference to FIG. 3A, the wearable authentication device 100 may obtain authentication information directly from the user. User authentication information—provided by a user via user input—may be sent to a personal communication device 300, and transaction completion information may be sent from the personal communication device 300 via a wearable authentication device 100 to a transaction device 200. Security is enhanced because the user is authenticated before the personal communication device 300 transmits transaction completion information. By way of non-limiting examples, a user may provide authentication information by entering a PIN or pass code using the user input interface 110 on the wearable authentication device 100, or by providing a fingerprint using the biometric input interface 114 on the wearable authentication device 100. In some embodiments, the user may receive confirmation of the information entered on the user output interface 112.

After receiving the authentication information provided by the user, the wearable authentication device 100 may transmit the authentication information to the personal communication device 300. If the personal communication device 300 successfully authenticates the user using the transmitted authentication information, the personal communication device 300 may transmit transaction completion information to the wearable authentication device 100. The wearable authentication device 100 in turn may transmit the transaction completion information to the transaction device 200. In some embodiments, transaction completion information stored on the personal communication device 300 may be sent directly from the personal communication device 300 to the transaction device 200.

Figure 3B:
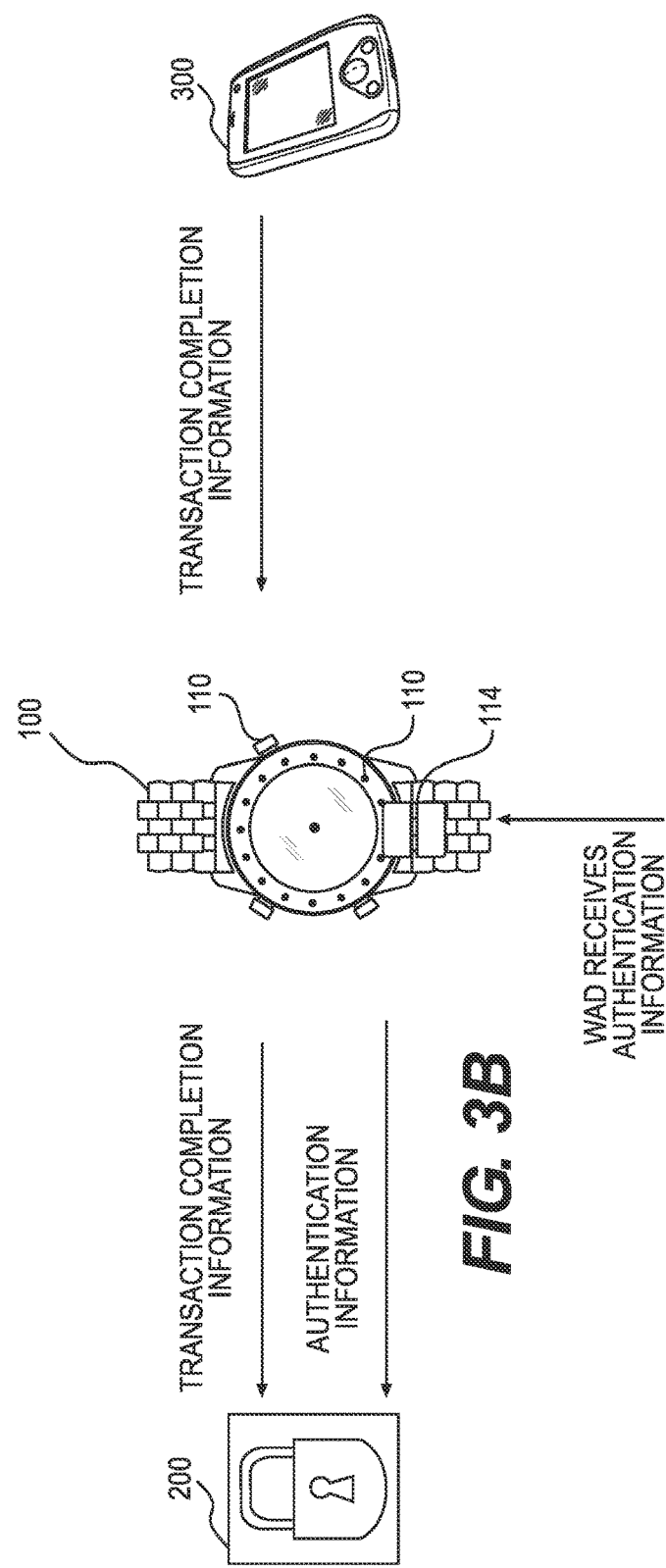
FIG. 3B is a diagram illustrating a user authentication system in which user authentication information—provided by a user via user input—is sent to a transaction device and transaction completion information is sent from a personal communication device via a wearable authentication device to a transaction device.

In another implementation of a secure transaction according to the present disclosure, with reference to FIG. 3B, the wearable authentication device 100 may obtain authentication information directly from the user. User authentication information—provided by a user, for example, via user input interface 110 and/or biometric input interface 114—may be sent directly to a transaction device 200 (not the personal communication device 300 as in FIG. 3A). Security is superior to a system in which the transaction device has its own user input interface because—in addition to providing authentication information—a user must be in physical possession of the wearable authentication device 100 itself. In addition, the user benefits from having a single user input interface that may be used with many different devices. In some embodiments, transaction completion information stored on the personal communication device 300 may also be sent from the personal communication device 300 to the transaction device 200 either directly or via the wearable authentication device 100. Similar to other embodiments, some or all of the information entered by the user or communicated among the devices may be displayed on the user output interface 112 such that it can be viewed by the user.

As previously discussed, to increase security, communications between the wearable authentication device 100 and personal communication device 300 may be encrypted to prevent a malicious device that does not belong to the user to (1) interject itself in the communications between the wearable authentication device 100 and personal communication device 300 (known as a man-in-the-middle attack), (2) alter the data communicated between the wearable authentication device and the personal communication device, (3) extract information from the communications between the wearable authentication device and the personal communication device in the event the malicious device intercepts them, or (4) otherwise derogate the security of the system.

Figure 4:
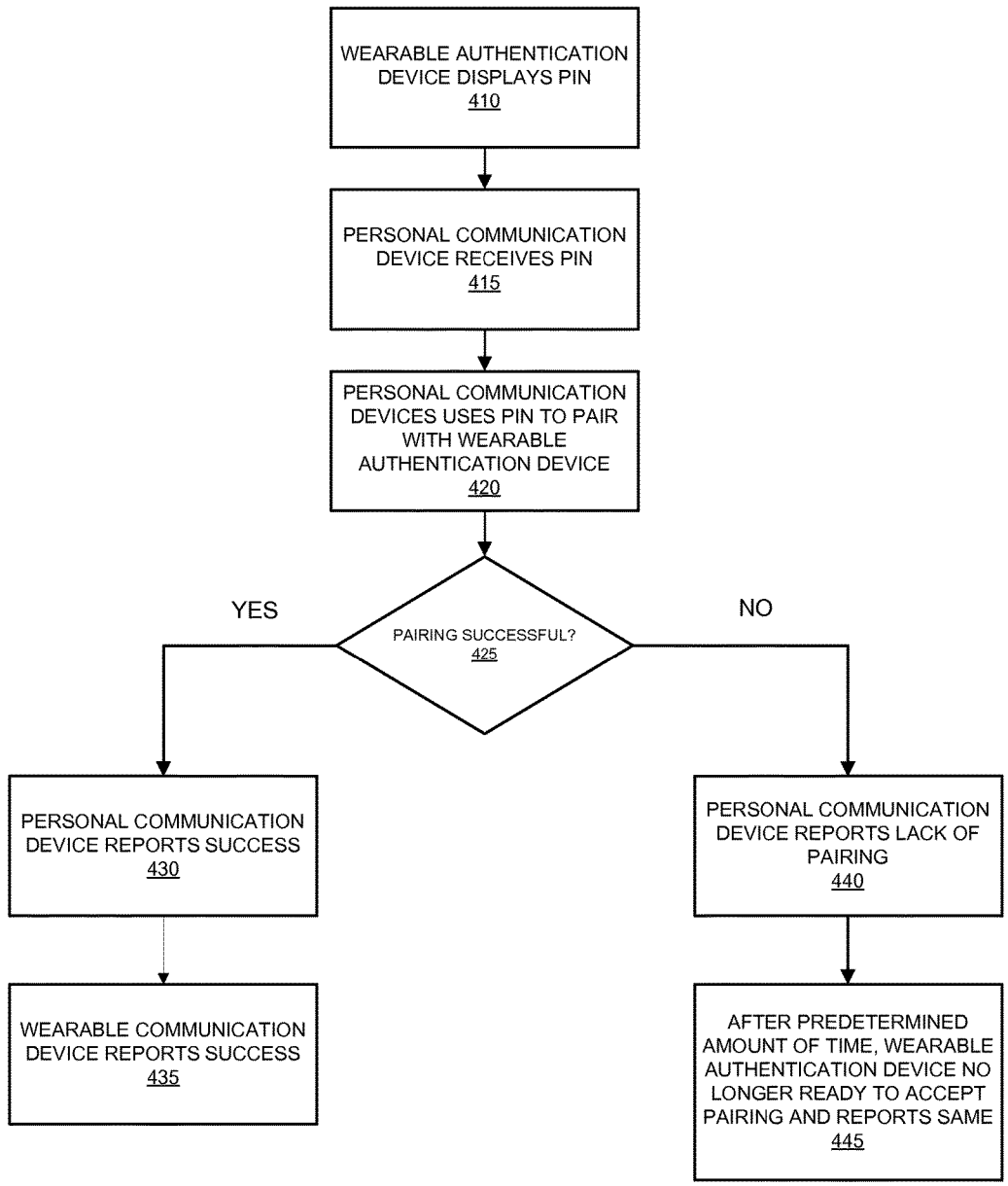
FIG. 4 is a flowchart illustrating an exemplary method for associating a wearable authentication device and a personal communication device to enable secure communication between the two.

In one embodiment, as shown in FIG. 4, the wearable authentication device 100 and personal communication device 300 may use Bluetooth technology to be associated together (also known as "pairing") such that they can securely communicate with each other using the Bluetooth protocol. Associating the two devices also prevents another unauthorized device to interject itself into the communications between the associated devices or to intercept the communications between the associated devices. In the method of FIG. 4, it is assumed that the wearable authentication device 100 and personal communication device 300 are not yet paired with each other, and that the wearable authentication device 100 is not yet paired to any other devices either. At step 410, the user manipulates the input interface 110 of the wearable authentication device 100 to cause the wearable authentication device to display a PIN that may be used to associate the wearable authentication device 100 with a personal communication device 300 as described herein. For example, the user may press a predetermined key, a predetermined series of keys, or otherwise interact with the authentication device through the user input interface 110 to cause the wearable authentication device 100 to display the PIN. The wearable authentication device may randomly generate a PIN or the PIN may be a device specific number that is stored in the memory 108 of the wearable authentication device (for example, at the time of manufacture).

At step 415, the personal communication device 300 receives the PIN. For example, the user may use the input interface 310 to input the PIN displayed by the wearable authentication device 100 into the personal communication device 300. At step 420, the personal communication device 300 may use the PIN to establish a connection with, and "pair with," the wearable authentication device 100. For example, an application stored on the memory 308 and running on the processor 306 may be able to utilize the PIN to pair the communication device 300 with the authentication device 100. The manner in which the personal communication device and the wearable authentication device may pair with each other using the Bluetooth protocol is well-known to those with ordinary skill in the art and will not be discussed in detail here.

If at step 425 the pairing is successful, at step 430 the personal communication device may report this fact to the user by, for example, displaying a notice to that effect on the display 312. Optionally, and to provide an additional level of assurance, at step 435 the wearable authentication device may also confirm the fact that it has successfully paired with the personal communication device (e.g., by displaying a confirmation on the display 112).

If at step 425 the pairing of the personal communication device 300 and wearable authentication device 100 is not successful, at step 440, the personal communication device may report this fact to the user. After a predetermined amount of time has passed, at step 445 the wearable authentication device may no longer be ready to accept pairing with any devices and may report this fact to the user. The predetermined amount of time may be selected in any appropriate manner (e.g., by the user, set as a default by the manufacturer, etc.).

In an alternative embodiment, instead of the wearable authentication device displaying a PIN which is then entered into the personal communication device to pair the two devices, the PIN may be displayed by the personal communication device which is then entered into the wearable authentication device. The wearable authentication device would then use the entered PIN to "pair with" the personal communication device.

Once the wearable authentication device 100 and personal communication device are associated with each other, they may securely communicate with each other. In one embodiment, once the two devices are associated with each other, they may not be associated with any other devices unless and until they are disassociated with each other. This is to prevent the wearable authentication device from being maliciously or surreptitiously associated with another device without the authorized user's knowledge or consent.

In one embodiment, when the user possesses both the wearable authentication device and the personal communication device, the two devices may be disassociated from each other by running an appropriate application program on the personal communication device that disassociates the two devices. Accordingly, the wearable authentication device returns to a state where it is ready to be associated (i.e., paired) with another device in a manner as described above.

In one embodiment, when the user does not possess the personal communication device 300 (for example, it has been lost, stolen or destroyed), the wearable authentication device may be equipped with a form of trigger or activation button (e.g., a reset button) that manually sets the device to its disassociated state. To prevent the accidental activation of such a trigger, it may be physically located in a location (e.g., inside the case or body of the device) where it cannot be easily or unintentionally activated.

Figure 5:
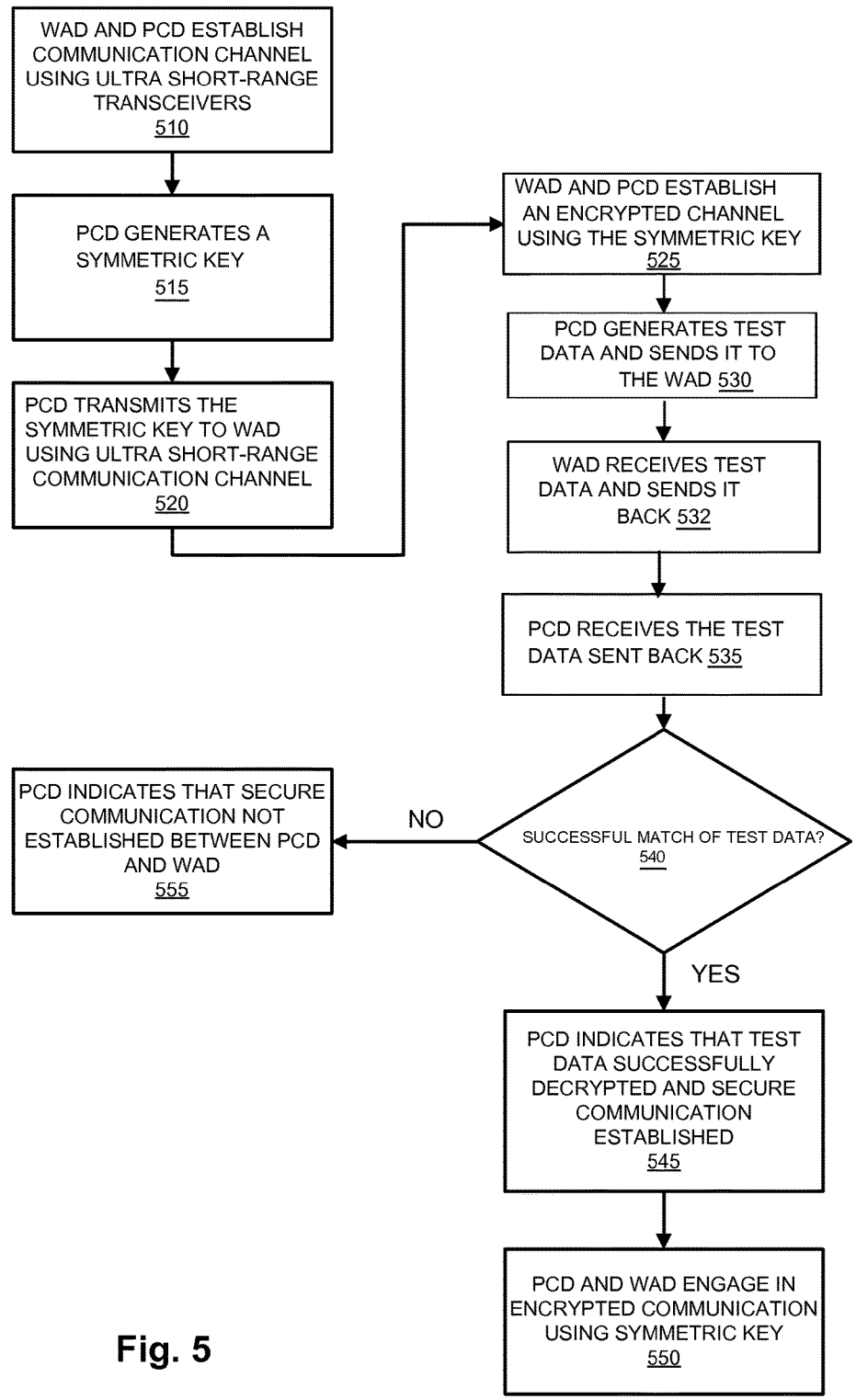
FIG. 5 is a flowchart illustrating an exemplary method for exchanging an encryption key and establishing encrypted communication between a wearable authentication device and a personal communication device.

FIG. 5 is a flow diagram depicting an alternative embodiment by which the wearable authentication device 100 and personal communication device 300 may establish a secure communication between each other. In the method according to FIG. 5, the wearable authentication device 100 and personal communication device 300 take advantage of the security that results from the fact that ultra short-range communication requires that the two devices be in the order of several millimeters or centimeters from each other to transmit a key between the devices that may be used to encrypt further communications. Because after the key is transmitted further communications may be encrypted, they may optionally be effectuated using the short-range transceivers 104, 304.

At step 510, the wearable authentication device 100 and personal communication device 300 establish a communication channel with each other using their respective ultra short-range transceivers 102, 302. The user may need to ensure that the two devices are close enough so that a communication channel may be established. Additionally, because the two devices need to be in the order of several millimeters or centimeters apart in order to establish a communication channel, the user can verify that there are no other potentially malicious device(s) within a range capable of establishing an ultra-short range connection with the wearable authentication device 100 and/or the personal communication device 300. Thus, the user can ensure that the data communicated during step 520 is only communicated between the intended wearable authentication device 100 and the personal communication device 300.

At step 515, the personal communication device may generate a random symmetric key for data encryption. At step 520, the personal communication device transmits the symmetric key to the wearable authentication device 100 through the ultra short-range transmission channel using the ultra short-range transceivers.

At step 525, the wearable authentication device 100 and personal communication device 300 may establish an encrypted channel (the wearable authentication device may use the encryptor/decryptor 106 to accomplish this) using the symmetric key received in step 520. It is to be understood that the encryptor/decryptor 106 may be used to implement any appropriate encryption methodology such as, but not limited to, AES, Twofish, Serpent, or any other encryption technology discussed herein, known in the art or developed in the future. The encryptor/decryptor 106 may be implemented as one or more Application Specific Integrated Circuits (ASIC), a general purpose processor running the appropriate application program(s) for encrypting/decrypting information, or any combination of the foregoing. Although the encryptor/decryptor 106 is depicted as one logical block in FIG. 1, it is to be understood that the functionality of the encryptor/decryptor may be separated out and spread across a combination of multiple hardware and/or software modules.

Many different techniques may be used to establish an encrypted channel between two parties using a symmetric key known to both parties. For example, when sending a packet of data over the channel, the sender may prepend a random salt and a number of the packet at the beginning of the packet, then add a checksum to the packet, and encrypt the whole packet (including the pre-pended data and checksum) with the symmetric key. The receiver may decrypt the received encrypted packet and check to determine that the sequence number of the packet is in a proper sequence (compared to the number of the preceding packet received over this channel). If the sequence number of the packet does not match the expected one or if the checksum does not match, the receiver may determine that the encrypted channel is broken and needs to be re-established.

While the wearable authentication device 100 may establish an encrypted channel over the already established ultra short-range communication channel, the wearable authentication device 100 may instead establish the encrypted channel over a short-range communication channel using the short-range transceivers 104, 304. By using the short-range communication instead of ultra short-range communication, a user may be able to put the personal communication device 100 away (e.g., in a purse or in a pocket) once the symmetric key has been exchanged. Additionally, the user need not worry about the communications over the short range communication channel being intercepted because they are already encrypted.

At step 530, the personal communication device 300 may generate test data (e.g., a random bit string) and send it to the wearable authentication device 100 via the encrypted channel established in step 525. As the channel is encrypted, such sending at step 530 may include encryption of the test data. Then at step 532, the wearable authentication device 100 may receive the test data, and thereafter transmit the test data back to the personal communication device 300 over the encrypted channel. As the channel is encrypted, such receiving and transmitting at step 532 may include decryption of the received test data and encryption of the decrypted test data respectively.

At step 535, the personal communication device 300 receives the test data over the encrypted channel. As the channel is encrypted, such receiving at step 535 may include decryption of the received test data. If at step 540, the personal communication device 300 successfully matches the test data received to the test data that was transmitted to the wearable authentication device 100, at step 545 the personal communication device 300 may communicate that fact to the user (e.g., by displaying a notice to that effect), and at step 550 the personal communication device 300 and the wearable authentication device 100 may use the symmetric key for further communication over a short range communication channel. For example, they may use the encrypted channel established in step 525, or establish a new encrypted channel using the symmetric key they both have.

If at step 540 the received test data does not match the test data that was previously transmitted to the wearable authentication device 100, at step 555 the personal communication device 300 may notify the user that secure communication has not been established between the personal communication device and the wearable authentication device. If secure communication is not established, the user may choose to repeat the method of FIG. 5 in order to establish such secure communication.

It should be noted that while the previous discussion referred to symmetric cryptography, it is possible to use asymmetric cryptography instead.

Figure 6:
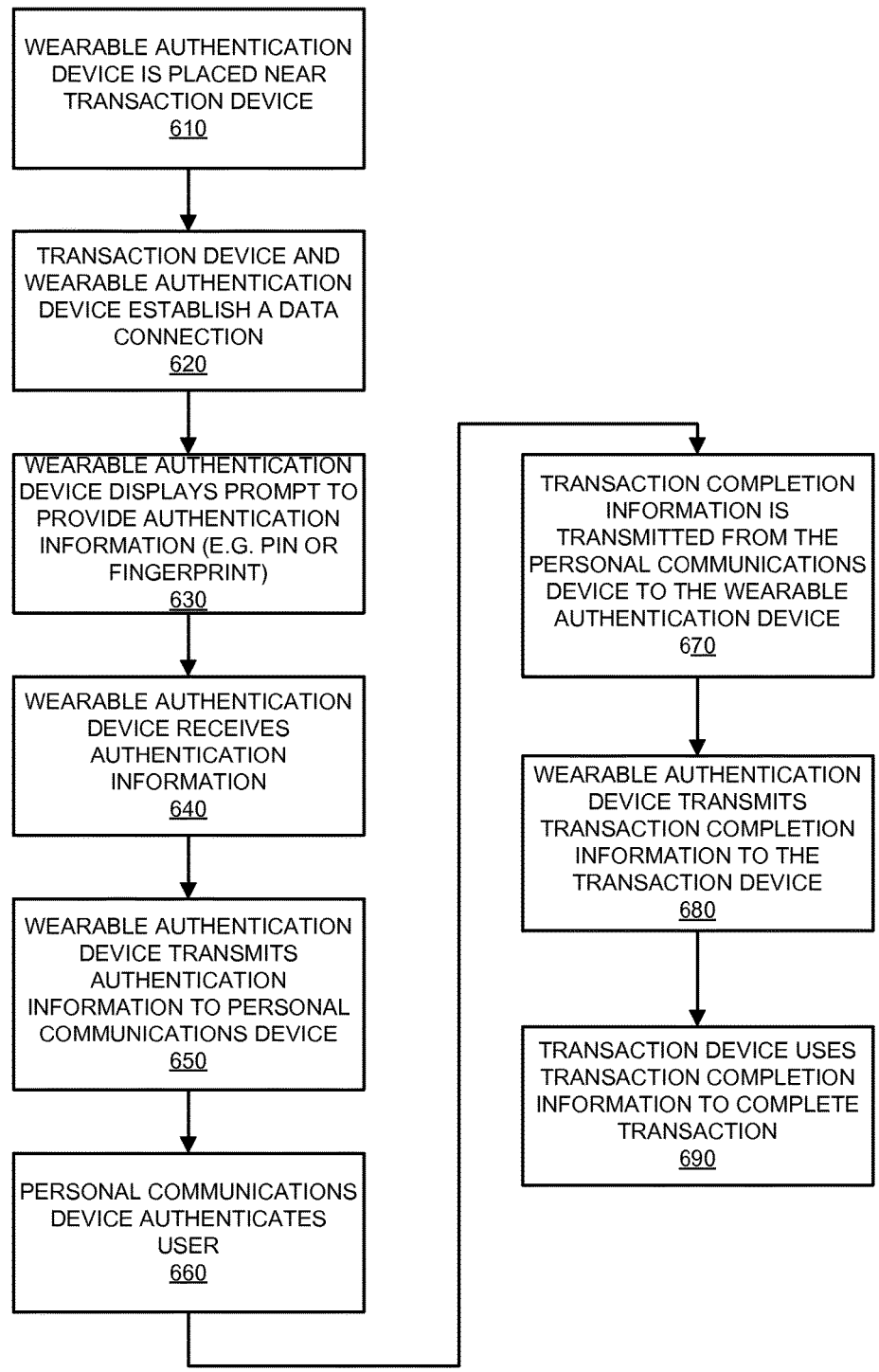
FIG. 6 is a flowchart illustrating an exemplary embodiment for authenticating a user.

In an exemplary embodiment of the present disclosure, with reference to FIG. 6, the wearable authentication device 100 may be used to provide authentication information and transaction completion information in a secure transaction. At step 610, a user positions a wearable authentication device 100 near a transaction device 200, allowing the devices to communicate with each other via ultra short-range data transmission technology. At step 620, the transaction device 200 and the wearable authentication device 100 establish a data connection. At step 630, the wearable authentication device 100 displays a prompt on the user output interface 112 to prompt the user to provide authentication information (e.g., a PIN or a fingerprint).

At step 640, the wearable authentication device receives the authentication information. For example, the user may enter the authentication information via the user input interface 110 and/or biometric input interface 114 of the wearable authentication device 100. At step, 650, the wearable authentication device transmits encrypted authentication information to a personal communication device 300 using the short-range transceiver 104. At step 660, the personal communication device 300 receives, decrypts and processes the authentication information to authenticate the user. At step 670, assuming the personal communication device 300 successfully authenticated the user using the transmitted authentication information, encrypted transaction completion information (e.g., a credit card number or flight confirmation code) is transmitted from the personal communication device 300 to the wearable authentication device 100 using short-range transceiver 304. At step 680, the wearable authentication device 100 decrypts the transaction completion information and transmits the transaction completion information to the transaction device 200 via ultra short-range data transmission technology. At step 690, the transaction device 200 uses the transaction completion information to complete a secure transaction.

Figure 7:
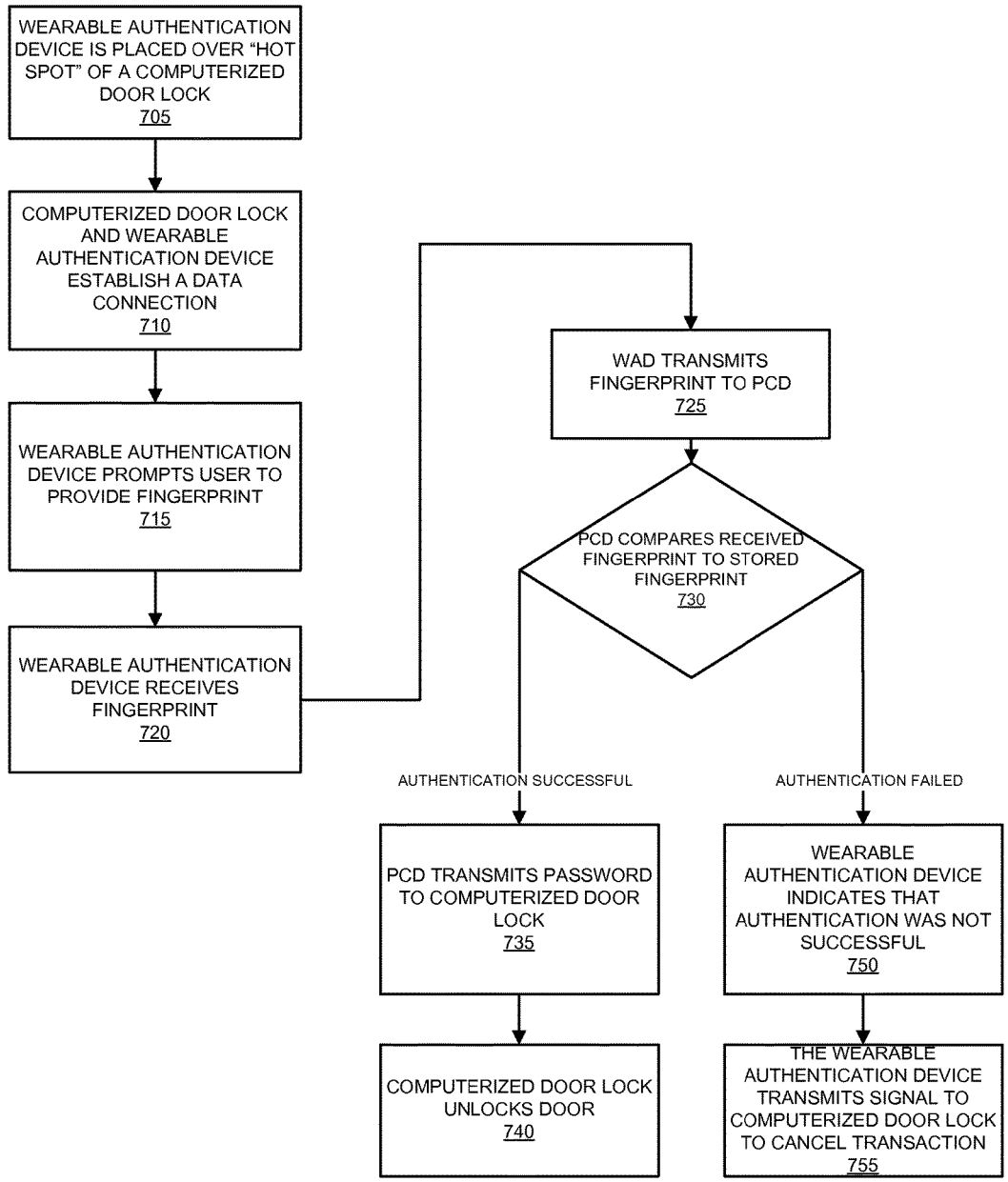
FIG. 7 is a flowchart illustrating an exemplary embodiment for authenticating a user at a secured entrance.

In an exemplary embodiment of the present disclosure, with reference to FIG. 7, the wearable authentication device 100 may be used by an employee to open a door secured by a computerized lock, allowing the employee to open doors at his or her workplace without using a key. At step 705, a wearable authentication device 100 may be placed over the "hot spot" of a computerized door lock 200. At step 710, the computerized door lock 200 and wearable authentication device 100 may establish a data connection via ultra short-range transmission technology. At step 715, the user may be prompted to provide a fingerprint via the biometric input interface 114 of the wearable authentication device 100. At step 720, the wearable authentication device 100 may receive the fingerprint. For example, the user may provide a fingerprint via the biometric input interface 114 of the wearable authentication device 100. At step 725, the wearable authentication device 100 may encrypt and transmit the fingerprint to the personal communication device 300 via short-range transmission technology.

At step 730, to authenticate the user, the personal communication device 300 may decrypt and compare the provided fingerprint to a fingerprint stored securely in the memory of the personal communication device 300. If at step 730 the authentication is successful, at step 735 the personal communication device 300 may transmit the employee password to the computerized door lock 200. In one embodiment, in general, the password may first be transmitted from a personal communication device 300 to a wearable authentication device 100 in an encrypted manner, decrypted by the wearable authentication device 100, and then transmitted by the wearable authentication device 100 to a transaction device 200 (e.g., the computerized door lock in this case) using ultra short-range communication technology. At step 740, the computerized door lock 200 may complete the transaction and opens the door. If at step 730 authentication is not successful, at step 750, the wearable authentication device 100 indicates (e.g., by displaying a message) that authentication was not successful. At step 755, the wearable authentication device 100 transmits a signal to the computerized door lock 200 to cancel the transaction.

Figure 8:
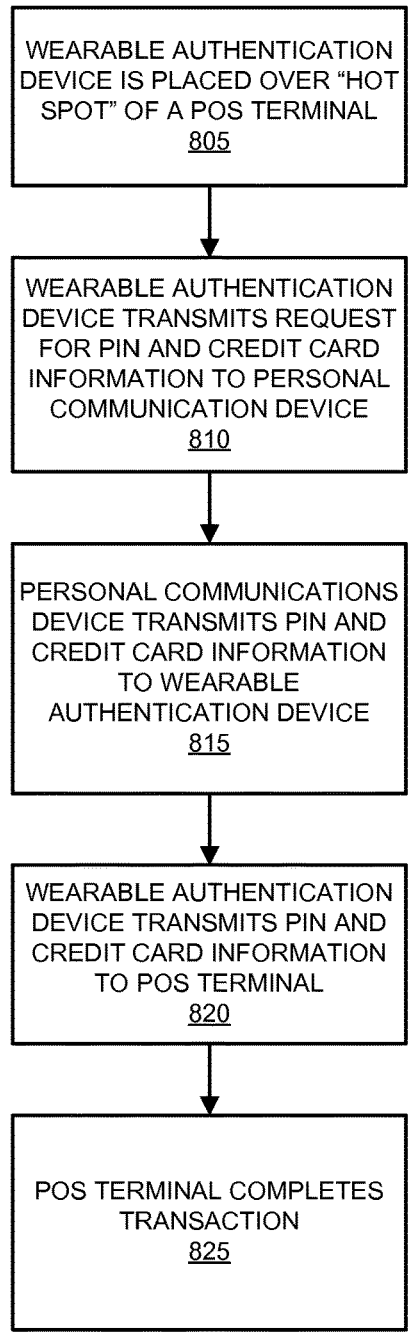
FIG. 8 is a flowchart illustrating an exemplary embodiment for authenticating a user in a credit card transaction.

In another exemplary embodiment of the present disclosure, with reference to FIG. 8, the wearable authentication device 100 may be used to provide a PIN and credit card information during a point-of-sale (POS) transaction, allowing a customer to pay for items without using a physical card or entering a PIN. At step 805, a wearable authentication device 100 may be placed over the "hot spot" of a POS terminal 200. At step 810, the wearable authentication device 100 may transmit a request for a PIN and credit card information to the user's mobile phone 300. At step 815, the mobile phone 300 may encrypt the PIN and credit card information and transmit the encrypted information to the wearable authentication device 100. The credit card information may include a credit card number, an expiration date, a card security code, or other information necessary for completing the transaction. At step 820, the wearable authentication device 100 may decrypt the PIN and credit card information and transmit the information to the POS terminal 200 via ultra-short range transmission technology. At step 825, the POS terminal 200 may complete the transaction. As with a traditional credit card transaction, the POS terminal may decline the transaction if the credit card information is incorrect.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims, in which all terms are meant in their broadest reasonable sense unless otherwise indicated therein.

What is claimed is:

1. A wearable device comprising: a short-range transceiver configured to communicate data between the wearable device and a personal device via a short-range channel; an ultra short-range transceiver configured to communicate data between the wearable device and a transaction device via an ultra short-range channel; and a processor configured to: transmit to the personal device a request for transaction completion information associated with the transaction device and user authentication information that authenticates a user to the transaction device; receive an encryption key from the personal device; receive the transaction completion information and the user authentication information from the personal device, wherein the transaction completion information and the user authentication information are encrypted according to an encryption algorithm associated with the encryption key; decrypt the transaction completion information and the user authentication information according to the encryption key; and transmit, by the wearable device, via an ultra short-range transceiver through an ultra short-range channel the transaction completion information and the user authentication information to the transaction device.

2. The wearable device of claim 1, further comprising an interface configured to display the user authentication information or the transaction completion information.

3. The wearable device of claim 1, further comprising an interface configured to receive a user input, wherein the processor is further configured to transmit the user input with the request for transaction completion information, wherein the user input is a type selected from the group comprising: a passcode, a PIN, and a biometric reading.

4. The wearable device of claim 1, wherein to transmit the transaction completion information and the user authentication information to the transaction device, the processor is further configured to encrypt the transaction completion information and the user authentication information using a second encryption key.

5. The wearable device of claim 1, wherein the processor transmits the request for transaction completion information to the personal device when the wearable device is located within a communication distance of the short-range transceiver.

6. The wearable device of claim 5, wherein the communication distance of the short-range transceiver is within a range of zero to two meters.

7. The wearable device of claim 1, wherein the short-range transceiver is configured to communicate using a protocol selected from the group comprising: induction-based communication, Bluetooth, and Wi-Fi.

8. The wearable device of claim 1, wherein the ultra short-range transceiver is configured to transmit the transaction completion information and the user authentication information to the transaction device when the wearable device is located within a communication distance of the ultra short-range transceiver.

9. The wearable device of claim 8, wherein the communication distance of the ultra short-range transceiver is within a range of zero to less than a meter.

10. The wearable device of claim 8, wherein the processor is further configured to request the transaction completion information from the personal device upon entering the communication distance of the ultra short-range transceiver with respect to the transaction device.

11. The wearable device of claim 1, wherein the encryption algorithm associated with the encryption key is selected from the group comprising: AES, Twofish, Serpent, Blowfish, CAST5, and RC4.

12. A device-implemented method comprising:
transmitting, by a wearable device, via a short-range transceiver through a short-range channel to a personal device a request for transaction completion information associated with a transaction device and user authentication information that authenticates a user to the transaction device;
receiving, by the wearable device, via the short-range transceiver an encryption key from the personal device;
receiving, by the wearable device, via the short-range transceiver the transaction completion information and the user authentication information from the personal device, wherein the transaction completion information and the user authentication information are encrypted according to an encryption algorithm associated with the encryption key;
decrypting, by the wearable device, the transaction completion information and the user authentication information according to the encryption key; and
transmitting, by the wearable device, via an ultra short-range transceiver through an ultra short-range channel the transaction completion information and the user authentication information to the transaction device.

13. The method of claim 12, wherein receiving the transaction completion information and the user authentication information from the personal device further comprises displaying, via an interface of the wearable device, the user authentication information or the transaction completion information.

14. The method of claim 12, wherein transmitting the transaction completion information and the user authentication information to the transaction device further comprises encrypting, by the wearable device, the transaction completion information and the user authentication information using a second encryption key.

15. The method of claim 12, wherein the wearable device transmits the request for transaction completion information to the personal device when the wearable device is located within a communication distance of the short-range transceiver.

16. The method of claim 15, wherein the communication distance of the short-range transceiver is within the range of zero to two meters.

17. The method of claim 12, wherein the short-range transceiver is configured to communicate using a protocol selected from the group comprising: induction-based communication, Bluetooth, and Wi-Fi.

18. The method of claim 12, wherein the wearable device transmits the transaction completion information and the user authentication information to the transaction device when the wearable device is located within a communication distance of the ultra short-range transceiver.

19. The method of claim 18, wherein the wearable device transmits the request for transaction completion information to the personal device upon the wearable device entering the communication distance of the ultra short-range transceiver with respect to the transaction device.

20. The method of claim 18, wherein the communication distance of the ultra short-range transceiver is within a range of zero to less than a meter.

* * * * *